(12) United States Patent
Gooch et al.

(10) Patent No.: US 8,897,139 B2
(45) Date of Patent: Nov. 25, 2014

(54) PACKET PROCESSING INDICATION

(75) Inventors: Mark Gooch, Roseville, CA (US); Steven G. Jorgensen, Newcastle, CA (US); Bruce E. LaVigne, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1656 days.

(21) Appl. No.: 12/328,961

(22) Filed: Dec. 5, 2008

(65) Prior Publication Data
US 2010/0142539 A1 Jun. 10, 2010

(51) Int. Cl.
G01R 31/08 (2006.01)
H04L 12/801 (2013.01)
H04L 12/931 (2013.01)
H04L 12/825 (2013.01)

(52) U.S. Cl.
CPC ............. H04L 47/10 (2013.01); H04L 49/354 (2013.01); H04L 47/26 (2013.01)
USPC .......................................... 370/236; 370/237

(58) Field of Classification Search
None
See application file for complete search history.

(56) References Cited

U.S. PATENT DOCUMENTS

| 6,163,843 | A * | 12/2000 | Inoue et al. ...................... 726/11 |
| 6,820,133 | B1 * | 11/2004 | Grove et al. ................... 709/238 |
| 7,146,643 | B2 | 12/2006 | Dapp et al. |
| 7,808,897 | B1 * | 10/2010 | Mehta et al. ................... 370/230 |
| 8,077,695 | B2 * | 12/2011 | O'Neill ............................ 370/349 |
| 2002/0023227 | A1 * | 2/2002 | Sheymov et al. .............. 713/201 |
| 2002/0105910 | A1 * | 8/2002 | Maher et al. ................... 370/235 |
| 2003/0176188 | A1 * | 9/2003 | O'Neill ............................ 455/433 |
| 2004/0008706 | A1 * | 1/2004 | Sakamoto et al. ............. 370/401 |
| 2005/0041650 | A1 * | 2/2005 | O'Neill ............................ 370/355 |
| 2005/0147032 | A1 | 7/2005 | Lyon et al. |
| 2005/0174996 | A1 * | 8/2005 | Hara et al. ....................... 370/352 |
| 2006/0106922 | A1 | 5/2006 | Arregoces et al. |
| 2006/0161983 | A1 | 7/2006 | Cothrell et al. |
| 2006/0206940 | A1 | 9/2006 | Strauss et al. |
| 2007/0002736 | A1 | 1/2007 | Gade et al. |
| 2007/0025309 | A1 * | 2/2007 | Yano et al. ...................... 370/338 |
| 2008/0212579 | A1 * | 9/2008 | LaVigne et al. ............... 370/389 |
| 2008/0298392 | A1 * | 12/2008 | Sanchez et al. ................ 370/469 |

OTHER PUBLICATIONS

Ramakrishnan, et al., RFC3168—The Addition of Explicit Congestion Notification (ECN) to IP, Sep. 2001, http://www.faqs.org/rfcs/rfc3168.html, pp. 1-51.

* cited by examiner

Primary Examiner — Marsha D Banks Harold
Assistant Examiner — Hooman Houshmand

(57) ABSTRACT

A network, network devices, and methods are described for packet processing indication. A method includes tunneling a packet from a first network device to a second network device associated with a first checking functionality. The second network device has an address different than an original destination address of the packet. The method also includes return-tunneling the packet from the second network device to the first network device with an indication of whether the packet was processed by the first checking functionality. The method includes tunneling the packet from the first network device to a third network device associated with a second checking functionality in response to the indication being that the packet was not processed by the first checking functionality. The third network device has an address different from the original destination address of the packet.

20 Claims, 8 Drawing Sheets

| 460 | | | | | | | |
|---|---|---|---|---|---|---|---|
| | | CF CAPABILITIES TABLE | | | | | |
| 461 TUNNEL/CF NUMBER | 462 DESTINATION SWITCH IP ADDRESS | 463 CF CAPABILITIES | 464 CF COST METRIC | 465 TRANSMITTED PACKET/BYTE COUNT | 466 SECURITY/ AUTHENTICATION INFORMATION | 467 CF LOAD | 468 CF NETWORK CONGESTION |
| 0 (CF-1) | IP-D1 | FILE TRANSFER ADVANCED VIRUS DETECTION | 3 | P0, b0 | KeyS0 | 25% | NONE |
| 1 (CF-2) | IP-D2 | WEB TRAFFIC EMAIL TRAFFIC FIRE WALLING | 2 | P1, b1 | KeyS1 | 70% | FORWARD |
| ... | ... | ... | ... | ... | ... | ... | ... |
| N (CF-N) | IP-DN | WEB TRAFFIC ADVANCED VIRUS DETECTION | 1 | PN, bN | KeySN | 35% | BOTH |

| No. | IP_SA | IP_DA | Service | CF device |
|---|---|---|---|---|
| 1 | mark1 | mail_server | smtp | none. |
| 2 | mark1 | mail_server | pop3 | none. |
| 3 | mark1 | print_server | any | none. |
| 4 | mark1 | local_server | ftp | none. |
| 5 | mark1 | remote_server | ftp | 1. |
| 6 | mark1 | external_server | ftp | 2. |
| 7 | mark1 | internal_web_server | http | none. |
| 8 | mark1 | external_web_server | http | 3. |
| 9 | mark1 | local_server | ssh | none. |
| 10 | mark1 | remote_accounting_server | any | 1. |
| 11 | mark1 | remote_server | ssh | 3. |
| 12 | mark1 | external_server | ssh | DENY. |

*Fig. 5A*

| No. | ip_sa | ip_da | ip_proto | src_port | dst_port | action |
|---|---|---|---|---|---|---|
| 1 | 10.15.16.1/32 | 10.15.1.1/32 | 6 | X | 25 | PERMIT |
| 2 | 10.15.16.1/32 | 10.15.1.1/32 | 6 | X | 110 | PERMIT |
| 3 | 10.15.16.1/32 | 10.15.2.1/32 | X | X | X | PERMIT |
| 4 | 10.15.16.1/32 | 10.15.0.0/16 | 6 | X | 21 | PERMIT |
| 5 | 10.15.16.1/32 | 10.16.0.0/16 | 6 | X | 21 | CF1-COPY |
| 6 | 10.15.16.1/32 | 0.0.0.0/0 | 6 | X | 21 | CF2-COPY |
| 7 | 10.15.16.1/32 | 10.15.3.1/32 | 6 | X | 80 | PERMIT |
| 8 | 10.15.16.1/32 | 0.0.0.0/0 | 6 | X | 80 | CF3-COPY |
| 9 | 10.15.16.1/32 | 10.15.0.0/16 | X | X | 22 | PERMIT |
| 10 | 10.15.16.1/32 | 10.16.1.1/32 | 6 | X | X | CF1 |
| 11 | 10.15.16.1/32 | 10.16.0.0/16 | 6 | X | 22 | CF3-COPY |
| 12 | 10.15.16.1/32 | 0.0.0.0/0 | 6 | X | 22 | DENY |

*Fig. 5B*

PACKET PROCESSING INDICATION

BACKGROUND

Computing networks can include multiple network devices such as routers, switches, hubs, servers, desktop PCs, laptops, workstations, and peripheral devices, e.g., printers, facsimile devices, and scanners, networked together across a local area network (LAN) and/or wide area network (WAN).

One advantage realized by networks is the ability to share network resources among dispersed clients. For example, networks can include checking functionalities (CF) such as an intrusion system (IS), e.g., intrusion prevention system (IPS) and/or intrusion detection system (IDS) that serve to detect unwanted intrusions/activities to the computer network, as well as remediation servers that store operating system patches, virus definitions, etc. Unwanted network intrusions/activities may take the form of attacks through computer viruses and/or hackers, misconfigured devices among others, trying to access the network. To this end, an IS can identify different types of suspicious network traffic and network device usage that can not be detected by a conventional firewall. This includes network attacks against vulnerable services, data driven attacks on applications, host based attacks such as privilege escalation, denial of service attacks, port scans, unauthorized logins and access to sensitive files, viruses, Trojan horses, and worms, among others.

Previous approaches may have focused on a single CF, which may be local to a particular switch. Limited information may have been available regarding remote CFs and/or multiple CFs. For instance, in some networking applications, if a particular CF is too busy to process additional traffic, e.g., packets, and/or if a network path to a particular CF is congested, then the additional traffic may be dropped, e.g., by a destination switch associated with the particular CF. To a client, such network behavior may appear as though the additional traffic was dropped due network security violations or violations of other packet checking rules.

BRIEF DESCRIPTION OF THE DRAWINGS

FIG. 4 illustrates an example checking functionality (CF) capabilities table that includes CF capabilities and characteristics to which packets can be sent according to an embodiment of the present invention.

FIG. 5A illustrates an example access control list (ACL) table of possible classifications of packets that may be sent to a CF according to an embodiment of the present invention.

FIG. 5B illustrates an example ACL table of addresses, protocol, and port numbers according to an embodiment of the present invention.

DETAILED DESCRIPTION

Figure 1:
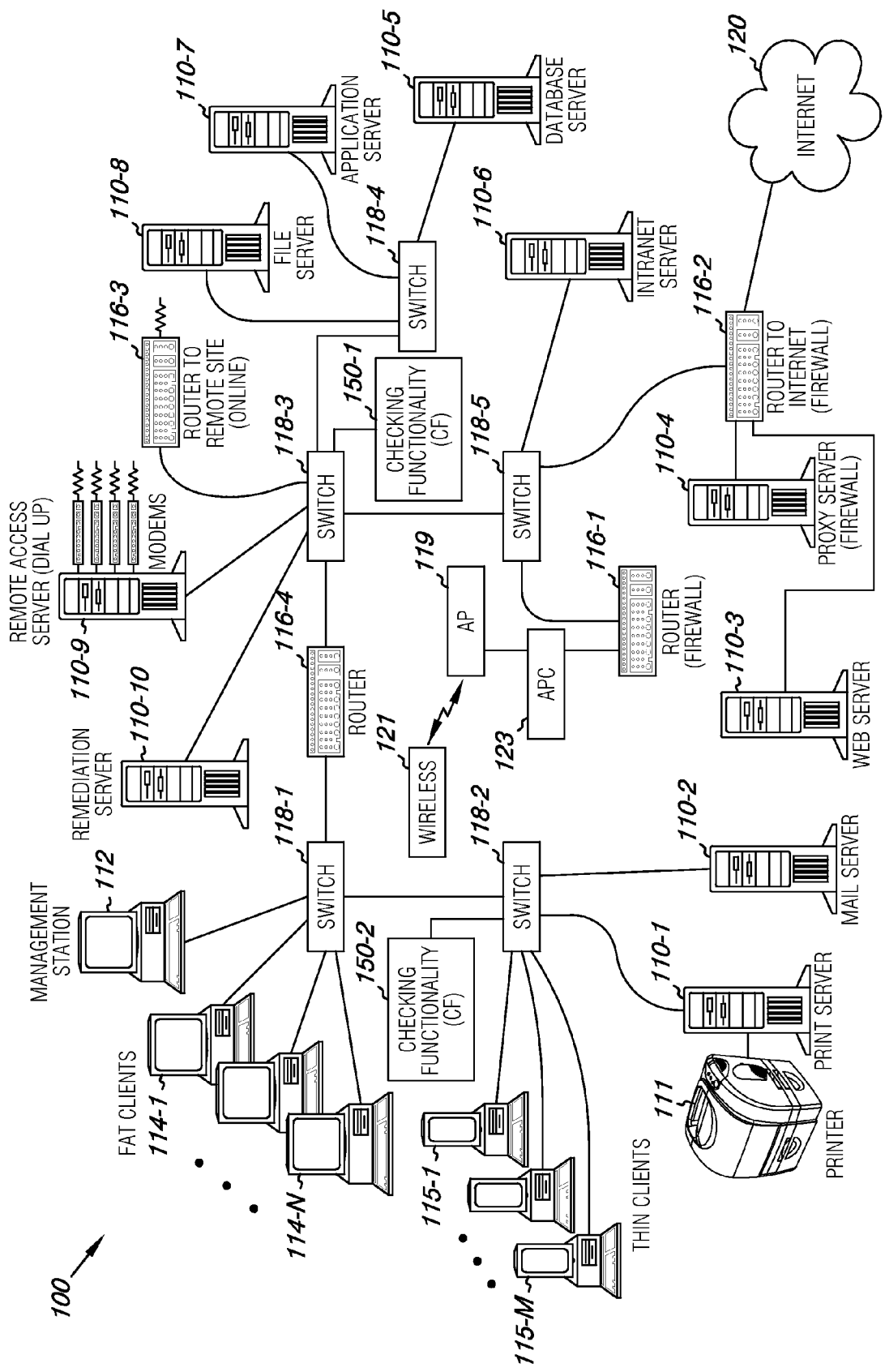
FIG. 1 illustrates an embodiment of a computing device network.

Embodiments of the present invention may include network devices, systems, and methods, including executable instructions and/or logic. In one embodiment of the present invention, a method for packet processing indication includes tunneling a packet from a first network device to a second network device associated with a first checking functionality. The second network device has an address different than an original destination address of the packet. The method also includes return-tunneling the packet from the second network device to the first network device with an indication of whether the packet was processed by the first checking functionality. The method includes tunneling the packet from the first network device to a third network device associated with a second checking functionality in response to the indication being that the packet was not processed by the first checking functionality. The third network device has an address different from the original destination address of the packet.

In the following detailed description of the present invention, reference is made to the accompanying drawings that form a part hereof, and in which is shown by way of illustration how one or more embodiments of the invention may be practiced. These embodiments are described in sufficient detail to enable those of ordinary skill in the art to practice the embodiments of this invention, and it is to be understood that other embodiments may be utilized and that process, electrical, and/or structural changes may be made without departing from the scope of the present invention. As used herein, the designators "N," "M," and "P," particularly with respect to reference numerals in the drawings, indicate that a number of the particular feature so designated can be included with one or more embodiments of the present invention. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide a number of additional embodiments of the present invention. In addition, as will be appreciated, the proportion and the relative scale of the elements provided in the figures are intended to illustrate the embodiments of the present invention, and should not be taken in a limiting sense.

FIG. 1 illustrates an embodiment of a computing device network 100. As shown in FIG. 1, a number devices can be networked together in a LAN and/or WAN via routers, hubs, switches and the like. As used herein a "network device" means a switch, router, hub, bridge, etc., e.g., a device having processor and memory resources and connected to a network 100, as the same will be understood by one of ordinary skill in the art. Although the term switch will often be used herein, those skilled in the art will realize that embodiments may be implemented with other network devices. As the reader will appreciate, the term network device can also be used to refer to servers, PCs, etc., as illustrated further below.

The example network of FIG. 1 illustrates a print server 110-1 and printer 111 to handle print jobs for the network 100, a mail server 110-2, a web server 110-3, a proxy server (firewall) 110-4, a database server 110-5, an intranet server 110-6, an application server 110-7, a file server 110-8, and a remote access server 110-9. A server, database server 110-5 for example, could serve as a checking functionality (CF) server, storing the list of available CFs for the network (where a CF can be an IS, counting device, accounting device, remediation device, Access Point Controller, etc). The examples described here do not provide an exhaustive list of servers that may be used in a network.

The embodiment of FIG. 1 further illustrates a network management station 112, e.g., a server, PC and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The embodiment of FIG. 1, illustrates that a number of these example network devices can be connected to one another and/or to other networks using routers, 116-1, 116-2, 116-3, and 116-4, and hubs and/or switches 118-1, 118-2, 118-3, 118-4, and 118-5. As noted above, such network devices can include a processor in communication with a memory and may include network chips having hardware logic, e.g., in the form of application specific integrated circuits (ASICs), associated with the number of network ports. The term "network" as used herein is not limited to the number, type, and/or configuration of network devices illustrated in FIG. 1.

As one of ordinary skill in the art will appreciate, many of the network devices (e.g., switches 118-1, 118-2, 118-3, 118-4, 118-5 and/or hubs) can include a processor in communication with a memory and will include network chips having logic, e.g., application specific integrated circuits (ASICs), and a number of network ports associated with such logic. By way of example and not by way of limitation, the network management station 112 includes a processor and memory. Embodiments of the various devices in the network are not limited to a number of ports, network chips and/or the type or size of processor or memory resources.

Additionally as the reader will appreciate, a number of mobile devices, e.g., wireless device 121, can connect to the network 100 via a wireless air interface (e.g., 802.11) which can provide a signal link between the mobile device 121 and an access point (AP) 119. The AP 119 serves a similar role to the base station in a wireless network, as the same will be known and understood by one of ordinary skill in the art. As shown in FIG. 1, the AP 119 can be linked to an access point controller (APC) 123, as the same will be known and understood by one of ordinary skill in the art, which connects the AP 119 over a packet switched signal link, e.g. an Ethernet link, to other network devices, e.g., router 116-1.

As one of ordinary skill in the art will appreciate, each network device in the network 100 can be physically associated with a port of a switch to which it is connected. Information in the form of packets can be passed through the network 100. Users physically connect to the network through ports on the network 100. Data frames, or packets, can be transferred between network devices by means of a network device's, e.g., switch's, logic link control (LLC)/media access control (MAC) circuitry, or "engines", as associated with ports on a network device. A network switch forwards packets received from a transmitting network device to a destination network device based on the header information in received packets. A network device can also forward packets from a given network to other networks through ports on one or more other network devices. As the reader will appreciate an Ethernet network is described herein. However, embodiments are not limited to use in an Ethernet network, and may be equally well suited to other network types, e.g., asynchronous transfer mode (ATM) networks, etc.

As used herein, the term "network appliance" is used to mean an add-on device, e.g., "plug-in" or "application module," to a network as contrasted with a "network device", e.g., router, switch, and/or hub, etc., which are sometimes considered more as "backbone" component devices to a network. As the reader will appreciate, a network appliance, e.g., checking functionality 150-1 or 150-2, can include processor and memory resources capable of storing and executing instructions to perform a particular role or function. A network appliance can also include one or more network chips, e.g., ASICs, having logic and a number of ports, as the same will be known and understood by one of ordinary skill in the art.

In the example network implementation of FIG. 1, a checking functionality (CF) 150-1 is shown in association with switch 118-3, and a CF 150-2 is shown in association with switch 118-2. In certain embodiments, the checking functionality performed by a network appliance, e.g. checking functionality 150-1 or 150-2, can perform the role of an intrusion prevention system (IPS), as may be supplied by a third party vendor of network security devices. In certain embodiments, the checking functionality 150-1 or 150-2 can perform the role of an intrusion detection system (IDS), or another diagnostic device, accounting device, counting device, etc., as may be supplied by a third party vendor. Additionally, a CF may be associated with a remediation server 110-10 and use a remediation Virtual Local Area Network (VLAN), as is described in more detail in co-pending, commonly assigned U.S. patent application Ser. No. 11/796,973, entitled "Remote Client Remediation," and having at least one common inventor, filed Apr. 30, 2007. The same is not described more fully herein so as not to obscure embodiments of the present invention. Embodiments are not limited to the examples given here.

As used herein, a network can provide a communication system that links two or more computers and peripheral devices, allows users to access resources on other computers, and exchange messages with other users. A network allows users to share resources on their own systems with other network users and to access information on centrally located systems or systems that are located at remote offices. It may provide connections to the Internet 120 or to the networks of other organizations. Users may interact with network-enabled software applications to make a network request, such as to get a file or print on a network printer. Applications may also communicate with network management software, which can interact with network hardware to transmit information between devices on the network.

Figure 2:
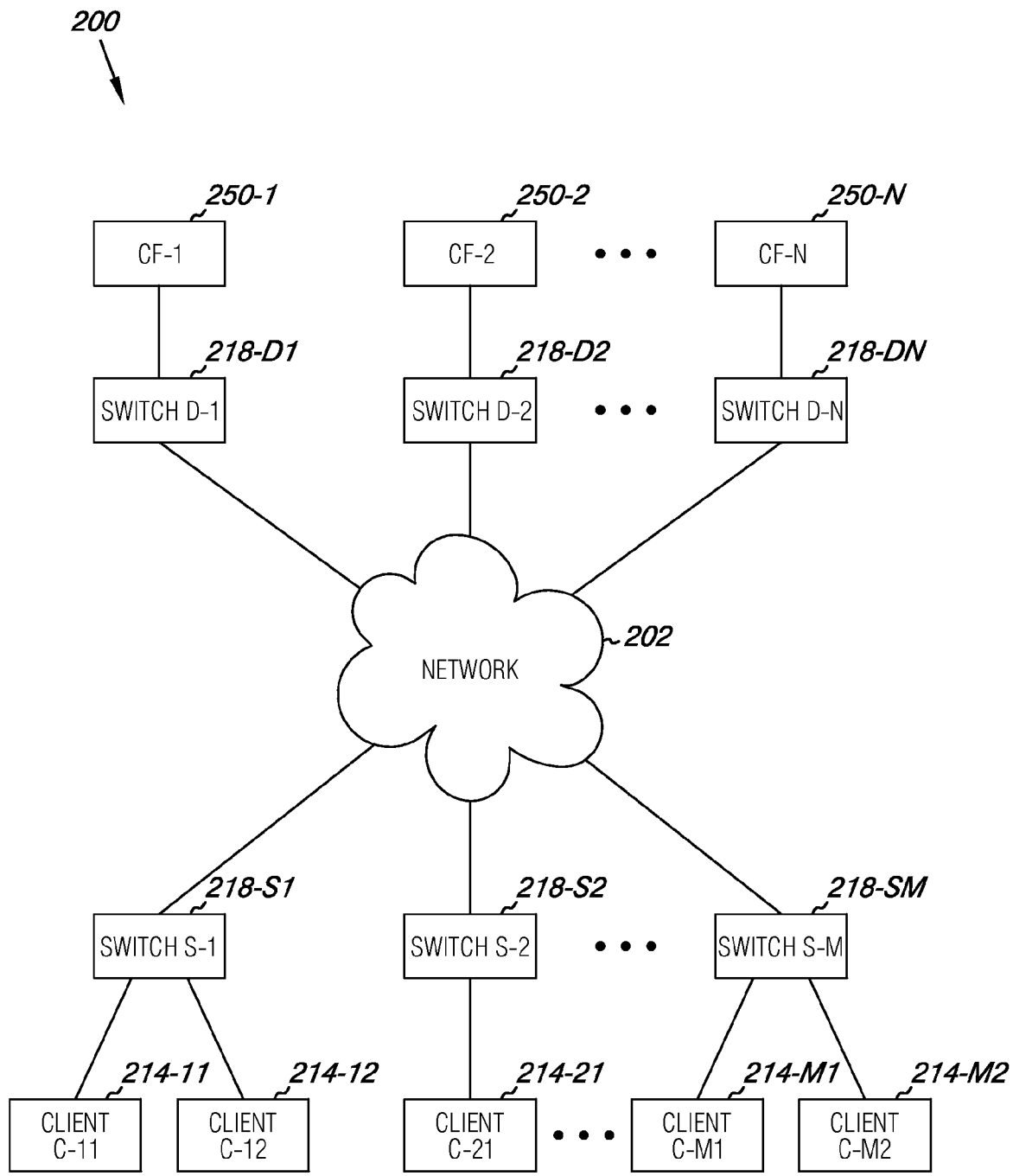
FIG. 2 is a block diagram illustrating a portion of a network, such as shown in FIG. 1, having network devices suited to implement embodiments of the present invention.

FIG. 2 is a block diagram illustrating a portion 200 of a network, such as shown in FIG. 1, having network devices 218-S1, 218-S2, . . . , 218-SM, and 218-D1, 218-D2, . . . , 218-DN, e.g., switches, suited to implement embodiments of the present invention.

Although reference is often made herein to switches, those skilled in the art will realize that embodiments of the invention may be implemented in other network devices. Examples of other network devices include, but are not limited to, wireless and/or wired routers, switches, hubs, bridges, etc., e.g., intelligent network devices having processor and memory resources.

The source, e.g., "first," switches 218-S1, 218-S2, . . . , 218-SM are each connected to a number of clients, 214-11, 214-12, . . . , 214-21, . . . , 214-M1, 214-M2. The switches 218-S1, 218-S2, . . . , 218-SM are also connected to a network 202 such as network 100 shown in FIG. 1. Destination, e.g., "second," or "third" switches 218-D1, 218-D2, . . . , 218-DN are each connected to a checking functionality (CF) 250-1, 250-2, . . . , 250-N. A checking functionality can be performed by a network appliance separate from a network device, e.g., CF 250-2 is shown as a separate device from switch 218-D2. Alternatively, a network device, e.g., switch 218-D1 in FIG. 2 can have a checking functionality integrated onboard the network device. The destination switches 218-D1, 218-D2, . . . , 218-DN are also connected to the network 202 linking them to the source switches. As used with respect to FIG. 2, the designators "N" and "M" illustrate that various networks can have various numbers of clients and network devices, e.g., switches.

A client, such as client 214-11 could send network traffic, e.g., packets, through switch 218-S1. As described in more detail in connection with FIG. 3, switch 218-S1 can have logic to identify packets for tunneling to a checking functionality. In the embodiment illustrated in FIG. 2, logic on switch 218-S1 can select a checking functionality, e.g., 250-2, from a list, such as that illustrated in CF capabilities table 460 in FIG. 4. In one or more embodiments, once switch 218-S1 selects a checking functionality, it can encapsulate and tunnel all identified packets from client 214-11 through the network 202 to the network device, e.g. 218-D2, that is associated with the selected checking functionality 250-2. However, in some instances it may be beneficial to tunnel different portions of traffic, e.g., packets, from a particular client to different switches, e.g., in response to network congestion. As used herein, congestion does not necessarily indicate disabling congestion, but can include lesser levels of congestion such as reduced performance levels, e.g., slow traffic.

When a network device, e.g., switch 218-D2, receives the packets tunneled from switch 218-S1, logic on the switch 218-D2, can decapsulate the packets and forward them to a CF, e.g., 250-2 for processing. Tunnel configuration, including creation and maintenance of tunnels between switches, e.g., source switch 218-S1 and destination switch 218-D1, is described in more detail in co-pending, commonly assigned U.S. patent application Ser. No. 11/827,742, entitled "Tunnel Configuration," and having at least one common inventor, filed Jul. 13, 2007.

As is illustrated in FIG. 2, a number of clients, e.g., 214-11 and 214-12 can be connected to a given network device, e.g., switch 218-S1. Furthermore, a switch 218-S1 can tunnel packets from multiple clients, 214-11 and 214-12, to one or more particular CFs, e.g. CF 250-1 via one or more second network devices, e.g., switch 218-D1.

To increase robustness, a network can contain multiple CFs each with differing capabilities. In such a case, it can be beneficial to direct, e.g., via tunnels, traffic that is to be examined to a CF device that has appropriate capabilities for the type of traffic being sent, e.g., the security level associated with both the sender and recipient of the traffic as well as the load on the CF. By balancing traffic across the multiple CFs, overall checking efficiency can be improved. In one or more embodiments, a source switch can identify packets for processing by more than one CF based on the differing capabilities of the CFs. For example, a particular packet may be identified for security checks of at least two different types provided by at least two different CFs. In such instances, the source switch can tunnel the packet to a destination switch associated with one of the CFs first. If the CF processes and approves the packet, the destination switch can return-tunnel it to the source switch. The source switch can then tunnel the packet to a destination switch associated with the other CF for further processing. If the other CF processes and approves the packet, the destination switch can return tunnel it to the source switch.

A switch can send network traffic to multiple CFs, e.g., functionally specialized CFs, in sequence before sending the traffic to its destination address. Such embodiments can be beneficial to cover multiple aspects of network security by processing at least a portion of network traffic with a number of specialized CFs.

To further increase robustness, information regarding any congestion experienced either in the forward or reverse packet path, as well as the current load on the CF device, can be encoded in the tunnel encapsulation headers. Such information can be used to avoid congested links or heavily loaded CFs.

Selecting an appropriate CF, from among multiple CFs, including considerations of CF capabilities, cost of using a particular CF, and the type of traffic being tunneled is described in more detail in co-pending, commonly assigned U.S. patent application Ser. No. 12/315,780, now U.S. Pat. No. 7,965,636, entitled "Loadbalancing Network Traffic Across Multiple Remote Inspection Devices," having at least one common inventor.

Although reference is made herein to a "first", e.g., "source," network device and a "second" or "third", e.g., "destination," network device, either network device could perform the functions of source and destination network devices as described herein. The terms "first" or "source" and "second," "third," or "destination" are used merely to aid in understanding the various functions of network devices as they perform operations according to embodiments described herein. As the reader will appreciate, a network device that is either connected to a CF, or has a CF integrated onboard the network device, e.g. a destination network device, could also receive packets from a client and tunnel identified packets to a different network device.

Figure 3:
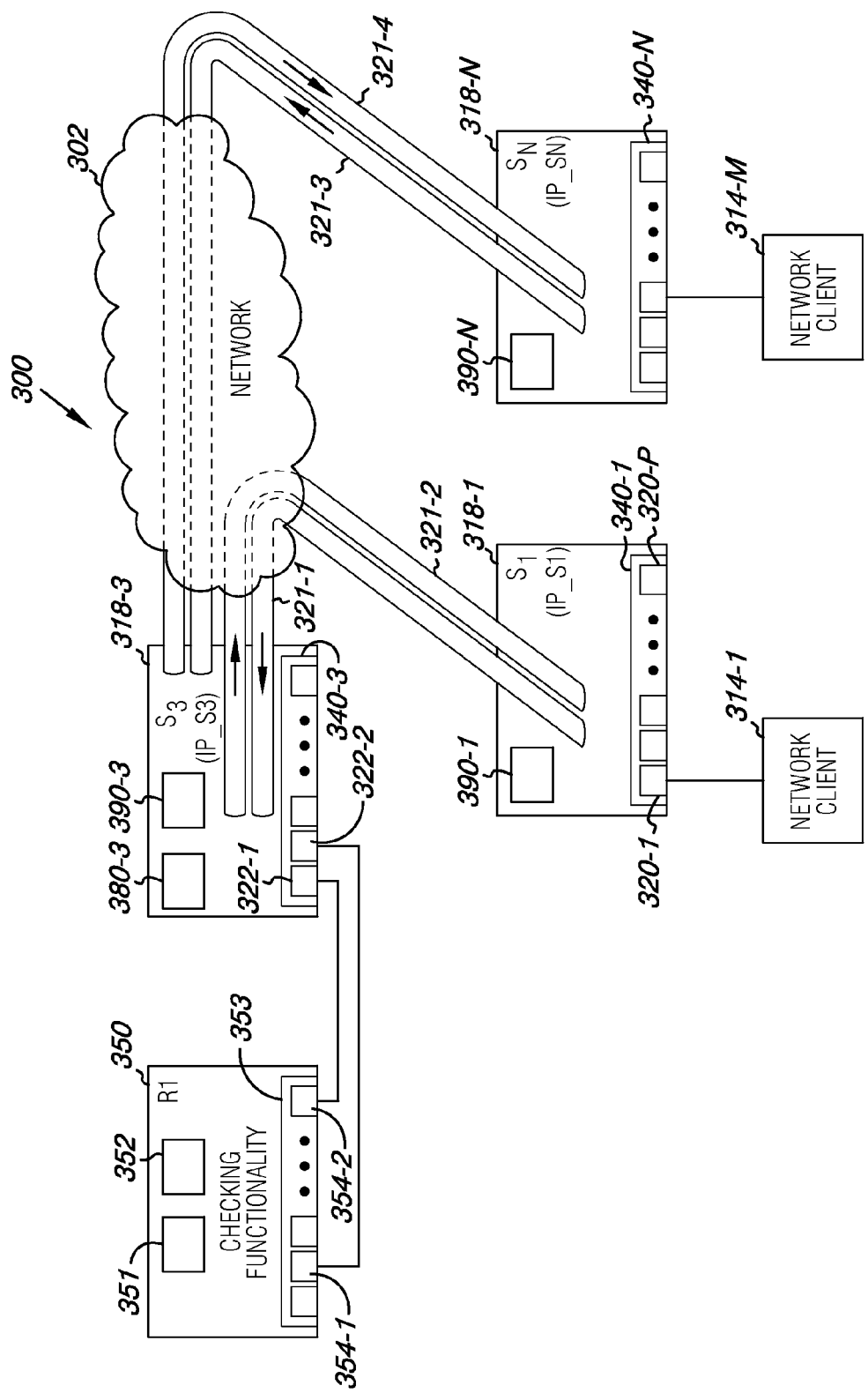
FIG. 3 illustrates a portion of a network, such as shown in FIG. 1, including network devices suited to implement embodiments of the present invention.

FIG. 3 illustrates a portion 300 of a network, e.g., network 100 shown in FIG. 1, including network devices, 318-1, 318-3, . . . 318-N suited to implement embodiments of the present invention. Certain devices are referred to as "source" network devices and other network devices are referred to as "destination" network devices. As used herein, "source" network devices means network devices, e.g., 318-1, having ports connected directly to network clients, 314-1, . . . 314-M. The network clients can include servers, "fat" and "thin" clients, including mobile network clients connected through an APC, etc., as discussed above in connection with FIG. 1. As used herein, "destination" network devices means network devices, e.g., 318-3, which are associated with checking functionalities (CFs), e.g., CF 350. Destination network devices can be associated with an external CF, as shown at 350, or can have a CF integrated onboard the network device, as shown at 380-3.

As described in connection with FIG. 1, the various network devices, 318-1, 318-3, . . . , 318-N, can include switches, routers, hubs, etc. (shown as switches in FIG. 3). Such network devices, 318-1, 318-3, . . . , 318-N, can include processor(s), and memory resources. The network devices, 318-1, 318-3, . . . , 318-N, can similarly include a number of network chips, e.g., 340-1, 340-3, . . . , 340-N, including logic circuitry (hardware) which can execute instructions and/or logic and each network chip, 340-1, . . . , 340-N, can include a number of network ports, 320-1, . . . , 320-P, and 322-1, 322-2, to send and receive packets (network traffic) throughout the network 302. As mentioned above, the logic circuitry of the number of network chips, e.g., 340-1, . . . , 340-N, can be in the form of an application specific integrated circuit (ASIC) and include logic to serve as a media access controller (MAC).

As shown in FIG. 3, a number of ports 320-1, . . . , 320-P can be included on a network chip 340-1, . . . , 340-N and can have access to logic circuitry associated with a network chip 340-1, . . . , 340-N and to the processor and memory. As used with respect to FIG. 3, the designators "N" and "P" are used to illustrate that various networks can have a various number of network devices, various numbers of network clients, and various network devices in a network may support or contain a various and/or different number of ports. Embodiments are not limited to the example shown in FIG. 3.

As shown in the embodiment of FIG. 3, a CF 350 can be connected to a network device, e.g., 318-3, which may be a destination network device. The CF 350 could also be provided as part of one or more switches, e.g., 318-3 at 380-3. As shown in FIG. 3, the CF 350 can include processor 351 and memory 352 resources capable of storing and executing instructions to perform a particular role or function. The CF can also include one or more chips (ASICs), e.g., 353, having logic and a number of ports, e.g., 354-1 and 354-2, as the same have been described above.

In various embodiments, the CF 350 is an intrusion prevention system (IPS), as may be supplied by a third party vendor of network security devices. In various embodiments, the CF 350 can be an intrusion detections system (IDS), another diagnostic device, an accounting device, a counting device, etc., as may be supplied by a third party vendor. Additionally, a CF may be a remediation server associated with a remediation VLAN, as noted above. Embodiments are not limited to the examples given here. Further, the various operations of such devices will be recognized and understood by one of ordinary skill in the art.

In the embodiment of FIG. 3, a packet is received from a port, e.g., 320-1, on a network device, e.g., switch 318-1, from a network client, e.g., 314-1. According to various embodiments, logic on the switch 318-1, e.g., logic associated with the hardware of the network chip 340-1, can identify original packets, which are received from or destined to a particular port, e.g., 320-1, on the device 318-1.

In some embodiments, logic can identify packets to send to a CF, e.g., 350, for security reasons, among others. One example of logic to identify packets to send to a CF, e.g., 350, is described in co-pending, commonly assigned U.S. patent application Ser. No. 11/712,706, entitled "Packet Tunneling," and having at least one common inventor, filed Mar. 1, 2007. The same is not described more fully herein so as not to obscure embodiments of the present invention.

In various embodiments, the logic selects a CF, e.g., 350, from a list, 390-1, 390-3, . . . , 390-N, also tables 460 in FIG. 4, of available CFs. The logic can configure a tunnel, e.g., tunnel 321-1, 321-3, through network 302, to a second network device, e.g., 318-3, associated with the CF 350 for tunneling. The list of available CFs can include the network addresses of the CFs and/or the network addresses of the destination switches with which the CFs are associated. The network addresses can be internet protocol (IP) addresses, among others. In one or more embodiments, the list 390-1 can include congestion status information for each CF, such as is described in more detail herein. Embodiments are not limited to including congestion status information in such a list as the information can be stored elsewhere.

According to various embodiments, the identified packets are tunnel encapsulated to tunnel the identified packets to a second network device, which may be a destination network device, e.g., switch (S3) 318-3, having a location different (e.g., remote) from an original MAC destination address of the identified packets. That is, the identified packets are sent via a tunnel to the second network device, e.g., 318-3, rather than forwarding the selected packets to their original MAC destination address. As the reader will appreciate, the tunnel may be a secure tunnel.

As used herein, tunnel encapsulating, e.g., tunneling, packets to a network device, which may have a location different (e.g., remote) from an original destination address of the selected data packets, can include encapsulating the data payload of the packets within a different delivery protocol. Packets can be tunneled without using regular forwarding logic in a manner that is transparent to the packet and client and/or network device as well. For example, when a packet is tunneled from a first network device to a second network device, it may pass through a number of other network devices, but the connection "appears" as though the packet is passing directly from the first network device to the second network device. According to some previous approaches for tunneling packets, a network packet would be sent through a tunnel as a part of the normal forwarding process, e.g., layer 2 bridging, or, more commonly, layer 3 routing. That is, in the case of IP routing, a next-hop route in an IP routing table would point to a tunnel. In contrast, tunnel embodiments described in the present disclosure are not used to form part of the normal forwarding path. That is, according to embodiments of the present disclosure, this ingress and egress from the tunnel are not a part of the regular forwarding process, and thus could be considered to be "transparent" to the network packet. Again, the original network packet, e.g., unencapsulated packet, will act, behave, and be operated upon as if it had just been received from a particular port, e.g., 320-1, on the network device 318-1 from a given network client, e.g., 314-1. This operation may include forwarding a packet to one CF or may, in some embodiments, include sending the packet to a different type of CF for further processing, e.g., a packet may be sent initially to an Access Point Controller for wireless applications and then to an IPS for a security application.

One example for tracking of the source switch, 318-1, and the setup of the return path, e.g., 321-2 or 321-4, for the packets by the destination switch, 318-3, is described in co-pending, commonly assigned U.S. patent application Ser. No. 11/788,179, entitled "Marked Packet Forwarding," having at least one common inventor, filed Apr. 19, 2007. The same is not described more fully herein so as not to obscure embodiments of the present invention.

FIG. 4 illustrates an example checking functionality (CF) capabilities table 460 that includes CF capabilities and characteristics to which packets can be sent according to embodiments of the present invention. That is, table 460 is populated with information used by logic of the first network device, e.g. source switch S-1 218-S1, from FIG. 2 to select a CF to which identified packets should be sent, among other uses. The logic of the first network device uses table 460 to configure and maintain tunnels to one or more second network devices associated with one or more selected CFs.

The table 460 includes column 461 "TUNNEL/CF NUMBER" for indicating available CFs and an associated tunnel number. Column 462 "DESTINATION SWITCH IP ADDRESS" indicates the destination address of the network device associated with a given CF. Column 463 "CF CAPABILITIES" indicates a list of capabilities, e.g., protocols and/or services, that a CF can understand and/or inspect. For example, a CF may understand web traffic, file transfer traffic, be able to perform advanced virus detection, firewalling, etc., and be listed as such. Column 464 "CF COST METRIC" indicates the relative cost of sending packets to each CF. Column 465 "TRANSMITTED PACKET/BYTE COUNT"

indicates the numbers of packets and bytes, tunneled to each CF. Column 466 "SECURITY/AUTHENTICATION INFORMATION" indicates security information which can be used to generate authentication or encryption information. Column 467 "CF LOAD" maintains information about the current load that the CF is experiencing, and column 468 "CF CONGESTION" maintains information about the congestion experienced by packets sent to/from a particular CF, e.g., via a destination switch. Such information can be useful in helping to prevent selection of an over-stressed CF, e.g., by a source switch.

In the embodiment illustrated in FIG. 4, Column 461 indicates that there are at least three possible CFs available. By way of example, and not by way of limitation, tunnel number 0 may be associated with CF-1, e.g., 250-1 in FIG. 2. Tunnel number 1 may be associated with CF-2, e.g., 250-2 in FIG. 2. Tunnel number N may be associated with CF-N, e.g., 250-N in FIG. 2. However, the designator "N" is intended to represent that a number of different CFs may be available. In various embodiments, the number of available CFs may be fewer or greater than three. The embodiment illustrated here is not intended to limit the number of network elements.

Column 462 indicates the IP addresses of network devices associated with each CF. For example, IP-D1 may be associated with the IP address for destination switch D1 218-1 in FIG. 2. IP-D2 may be associated with the IP address for destination switch D2 218-D2 in FIG. 2. IP-DN may be associated with the IP address for destination switch D-N 218-DN in FIG. 2.

Column 463 indicates the capabilities, e.g., protocols understood and/or services inspected, of the available CFs. For example, CF-1 can provide services associated with file transfer and advanced virus detection. CF-2 can handle web traffic, email traffic, and firewalling. CF-N can process web traffic and provide advanced virus detection. For example, a particular CF may be able to implement Access Control List (ACL) policies, such as "client A can not talk to client B," "client A can not access the web," etc. A more comprehensive CF may have capabilities to inspect data to check for viruses, e.g. if client A is downloading email, the more comprehensive CF may be able to inspect the email and scan it for viruses, etc. As a more comprehensive CF may be more expensive, by sending traffic for inspection to the appropriate CF, that is, the CF that has at least the capabilities associated with the level of checking that is desired for the packet in question, efficiency can be improved. Such improvements in efficiency may allow a network to be implemented with fewer of the more expensive and comprehensive CFs, reducing costs among other benefits.

Column 464 indicates the relative cost of sending network traffic to each CF. In the example embodiment illustrated in FIG. 4, CF-1 has a cost metric of 3, CF-2 has a cost metric of 2, and CF-N has a cost metric of 1. This indicates that it is 3 times more "expensive" to send traffic to CF-1 than CF-N. In this context, "expensive" encompasses factors such as the performance capabilities of the CF, its buffering capabilities, the network distance to the CF, etc. Again, the embodiments illustrated here are not limited to these examples. Other methods of deriving cost metrics are possible and will be understood and practiced by those of skill in the art according to the present invention.

Column 465 indicates the number of packets and bytes, e.g., P0, b0, tunneled to each CF. In this example embodiment, P0 may be associated with the number of packets tunneled to CF-1, and b0 may be associated with the number of bytes tunneled to the same checking functionality. P1 may be associated with the number of packets tunneled to CF-2, and b1 may be associated with the number of bytes tunneled to the same checking functionality. PN may be associated with the number of packets tunneled to CF-N, and bN may be associated with the number of bytes tunneled to the same checking functionality. This information can be used along with the cost metric as one method of determining to which CF a particular client's traffic should be sent.

Column 466 indicates stored security and authentication information for one or more checking functionalities. For example, KeyS0 may be associated with security information for CF-1. KeyS1 may be associated with security information for CF-2. KeySN may be associated with security information for CF-N.

Column 467 indicates the load associated with each CF. In the example embodiment illustrated in FIG. 4, CF-1 has a load of 25%, CF-2 has a load of 70%, and CF-N has a load of 35%. For example, this indicates that CF-2 is running at 70% of capacity.

Column 468 indicates the congestion associated with a network path to each CF, both in the forward and return paths. In one embodiment, such indications can include, for example, "none," e.g., no congestion on either path, "forward," e.g., congestion on the forward path only, "return," e.g., congestion on the return path only, or "both," e.g., congestion on both the forward and return paths. In the example embodiment illustrated in FIG. 4, CF-1 is experiencing no congestion, CF-2 is experiencing congestion in just the forward path, and CF-N is experiencing congestion in both the forward and return paths.

Explicit Congestion Notification (ECN) can be used in the encapsulation IP header to provide an indication of a congestion level of a network path to and from a particular CF. By using additional flags in the encapsulation header, an indication of the current load of the CF can be sent with one or more packets. Such information can allow logic on a network device to determine whether packets should be tunneled to a different CF, e.g., a second CF, during periods of network congestion or when the first CF is heavily loaded. ECN is described in more detail in RFC 3168, "The Addition of Explicit Congestion Notification (ECN) to IP."

In one or more embodiments, a congestion notification scheme other than ECN can be used. Such congestion notification schemes can provide additional granularity regarding the level of congestion, e.g., beyond whether it is present or not. In such embodiments, column 468 can include information consistent with the congestion notification scheme. For example, congestion relating to network paths to and from CFs can be represented in a relative manner such that a determination can be made whether a network path to and from a particular CF is more or less congested than a network path to and from a different CF.

In some embodiments, once a CF has been selected for a given client or traffic flow, all packets from that client or traffic flow that are selected for tunneling are tunneled to the same CF. A CF may function more effectively when all packets that are part of the same flow are checked by the same CF.

In various embodiments, the logic can select a CF based on traffic levels for each CF. Appropriate traffic levels for each CF can be determined based on the processing capacity of the CF, the network distance between a switch and the CF, how much traffic has already been allocated to the CF, among other means. As used here, "network distance" takes into account more than just physical distance. Network distance can also include link speeds and latency. For example, it can be advantageous to use high bandwidth, low latency links, even if the physical distance is longer.

In one or more embodiments, a network device receiving traffic from a client can buffer a copy of a packet and send the packet to a network device associated with a selected CF. In such embodiments, the network device associated with the CF can send a flag back to the network device associated with the client indicating whether the CF processed the packet and/or whether the CF approved the packet. Furthermore, as a packet may be dropped by a CF, or by a switch along a network path between the source and destination switches, the source switch may maintain a timeout on buffered packets such that if no reply is received regarding the a particular packet within a particular amount of time, then the source switch can take an action regarding the buffered packet. For example, the source switch can be configured to drop the buffered packet, e.g., discontinue buffering the packet, and/or forward the packet to its original destination. Such embodiments may use less network bandwidth, e.g., because the "destination" switch returns a flag rather than an entire packet, where the flag can include substantially less data than the packet. However, such embodiments may use significant packet buffering on the source switch, which can add cost and complexity to the network device and to the network as a whole.

A more comprehensive approach, as described herein, does not utilize packet buffering by the source switch. Rather, according to one or more embodiments, a destination switch can return the packet along with any appropriate flags, rather than just returning the flags, to the source switch. In such embodiments, the source switch can then forward the packet to its original destination address in instances where a CF processed and approved the packet. Alternatively, the source switch may send the packet to a second CF for additional processing even when the first CF processed and approved the packet. In instances where the CF did not process the packet, as indicated by one or more flags returned with the packet from the destination switch, the source switch can send the packet to a different CF, e.g., via a different destination switch associated therewith. The flags can be included in the encapsulation header of the packet being returned, and do not affect the payload of the packet itself, that is, the original packet sent by the client. In some embodiments, the source switch can preemptively avoid sending traffic, e.g., packets, to a CF that is oversubscribed, has congested links, or other considerations that may prevent the use of or reduce the efficiency of using the particular CF. In such embodiments, the source switch can preemptively send traffic to a different CF that has more available resources for processing network traffic. As described herein, such a preemptive determination can be made based on information that can be stored in a CF capabilities table, e.g., table 460.

In some embodiments, the tunnels can be secure tunnels. For example, a tunnel could include authentication to allow the destination network device to check that a tunneled packet truly did come from the source network device specified in the packet. Another example includes full encryption, which would fully protect the packet being tunneled from any snooping by others as it crosses the network.

In addition, there is no implied limitation herein on the number of tunnels that can be directed to any single destination switch (or checking functionality) from a single source switch. For example, two or more tunnel numbers may have identical destination switch IP addresses 462 but different security/authentication information 465. This allows tunneled traffic to be given different levels of security protection or sent via different network paths, for example.

The table illustrated in FIG. 4 can exist for each network device, i.e., both for source switches and destination switches. Destination network devices are capable of return-tunneling packets to a source network device. Likewise, source network devices are capable of receiving packets return-tunneled from destination network devices.

Although the embodiment illustrated in FIG. 4 uses switches as examples of network devices, embodiments are not so limited. As will be appreciated by one of ordinary skill in the art, other network devices can be used. Furthermore, the embodiment illustrated in FIG. 4 contains examples of information that can be stored in CF capabilities tables. The reader will appreciate that such tables could contain more or less information than is present in FIG. 4. Embodiments are not limited to the specific examples illustrated herein.

FIG. 5A illustrates an example access control list (ACL) table 500A of possible classifications of packets that may be sent to a CF according to an embodiment of the present invention. ACLs may be used for security purposes to either permit (allow) or deny (prevent) connections based on an IP addresses, IP protocol, and layer 4 port numbers contained in a particular packet. For example, FIG. 5A shows an ACL table 500A with a number of entries. The source address "IP_SA" column identifies the IP address of the sender of the packet. The destination address "IP_DA" column identifies the original destination address of the packet, e.g., the IP destination address. The service column identifies the service being requested, which can also include the protocol, TCP/UDP source port, and TCP/UDP destination port, among others. The CF device column indicates the CF device that packets matching this ACL entry can be processed by if a CF device is selected.

FIG. 5B illustrates an example ACL table 500B of addresses, protocol, and port numbers according to an embodiment of the present invention. Table 500B includes a source address column "ip_sa," a destination address column "ip_da," a protocol column "ip_proto," a TCP/UDP source port column "src_port," a TCP/UDP destination port column "dst_Port," and an action column.

In this example, the client's IP address is 10.15.16.1, e.g., this is the IP address of user "mark" in FIG. 5A, the mail server is 10.15.1.1, the print server is 10.15.2.1, the internal web server is 10.15.3.1, and the remote accounting server is 10.16.1.1. In addition, all addresses from 10.15.0.0 to 10.15.255.255 (i.e., 10.15.0.0/16) are considered "local", all addresses from 10.16.0.0 to 10.16.255.255 (i.e., 10.16.0.0/16) are considered "remote", and all other IP addresses are considered external.

The ACL table 500B can be set up by logic circuitry of a source switch. The initial policies can be determined by a network administrator, e.g., table 500B can represent a set of policies assigned to user mark1 and stored in hardware and/or software. Such a set of policies can be loaded into the extended ACL table in response to a source switch detecting a login by user mark1. In this example, all of the src_port values are initially "X", e.g., "don't care," and some of the ip_da fields cover a large range of destinations. For example, line 4 includes value 10.15.0.0/16 in the ip_da field, which is equivalent to 10.15.X.X and covers the address range 10.15.0.0 to 10.15.255.255. Such a range includes 64 k addresses, as will be appreciated by one of ordinary skill in the art.

As a client opens up connections to a number of destinations, new entries can be added to the table 500B where the traffic is being directed to a CF. To determine which CF to send traffic to when a new connection is opened up, logic circuitry of the source switch can determine the type of connection that is being attempted, e.g., http access to external web server, and compare this with the capabilities of each CF stored in the CF capabilities table, e.g., in column 463 of table 460 of FIG. 4. This operation will generate a list of capable CFs from which one can be chosen based on an algorithm using the CF cost metrics, e.g., column 464 in table 460 of FIG. 4, the perceived load placed on the CF by this source switch, which can be derived from the transmitted packet/byte counts, e.g., column 465 of table 460 in FIG. 4, the actual CF load, e.g., column 467 of table 460, and the network congestion to and from the CF, e.g., column 468 of table 460. An embodiment can include selecting the CF with the lowest cost metric that has the lowest load and least network congestion, although another algorithm and/or parameters can be used. Additional details and example algorithms can be found in co-pending, commonly assigned U.S. patent application Ser. No. 12/315,780, now U.S. Pat. No. 7,965,636, entitled "Loadbalancing Network Traffic Across Multiple Remote Inspection Devices," having at least one common inventor.

Figure 6:
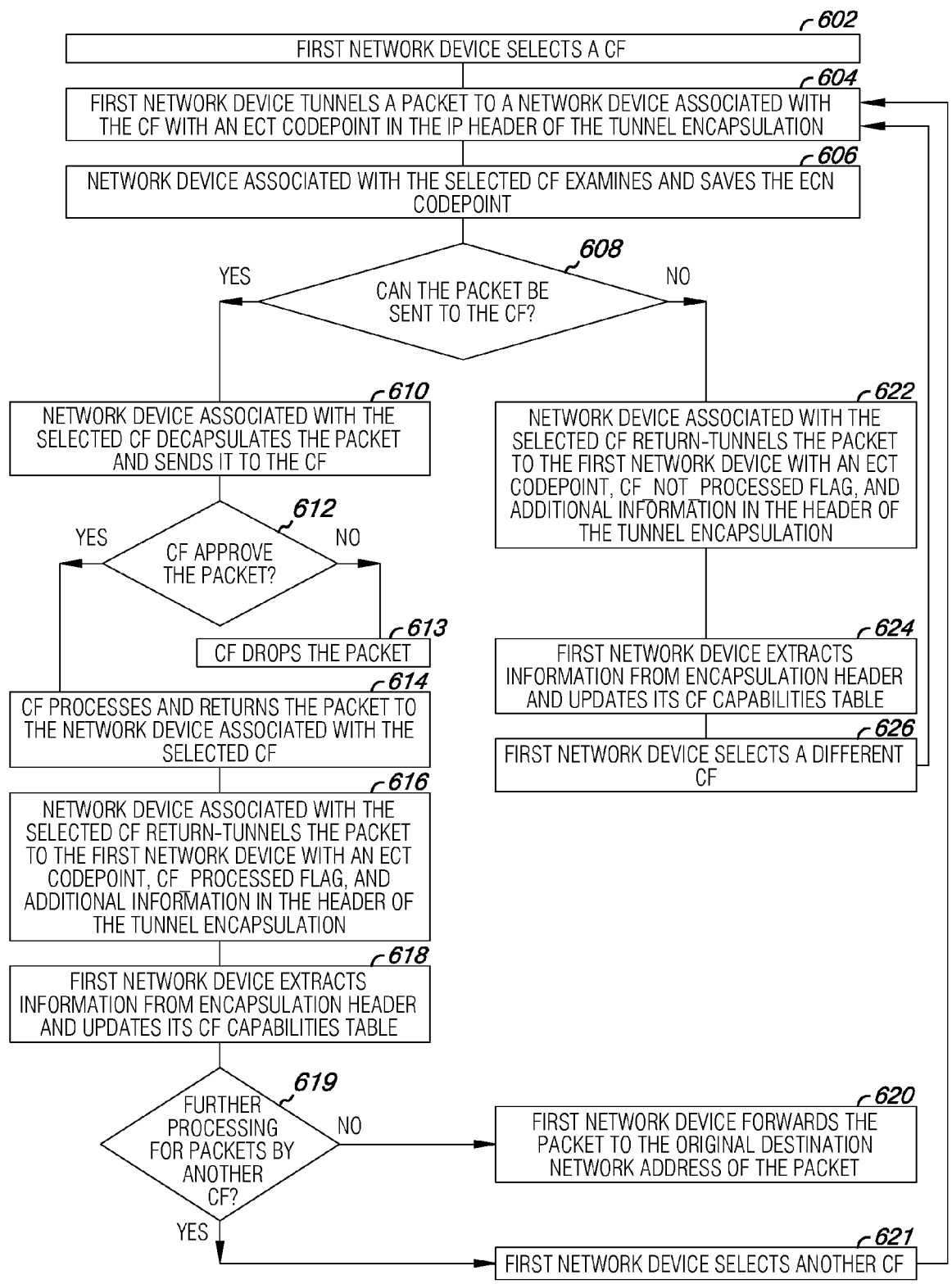
FIG. 6 provides a flow chart illustrating one method for packet processing according to an embodiment of the present invention.

FIG. 6 provides a flow chart illustrating one method for packet processing according to an embodiment of the present invention. A first network device, e.g., a source switch, e.g., 218-S1 in FIG. 2, selects 602 a checking functionality (CF), e.g., 250-1 in FIG. 2, to process a particular packet. According to embodiments, the first network device tunnels 604 the packet to a network device associated with the CF, e.g., 218-D1 in FIG. 2, with an ECN Capable Transport (ECT) codepoint in the IP header of the tunnel encapsulation, e.g., a codepoint value of $01_2$ or $10_2$. The network device associated with the selected CF, e.g., the second network device, examines and saves 606 the ECN codepoint upon receipt of the packet, e.g., whether the packet experienced congestion along its network path. If no congestion is experienced, the second network device can receive the same ECT codepoint in the IP header, e.g., a codepoint value of $01_2$ or $10_2$. If congestion is experienced, the second network device can receive a Congestion Experienced (CE) codepoint, e.g., a value of $11_2$. The congestion state of the network path from the first network device can thus be stored and associated with the first network device, e.g., the IP source address of the first network device can be maintained in a forward congestion status table along with a flag indicating its current network congestion state.

As described herein, the network device associated with the selected CF can determine 608 whether the packet can be sent to the CF, e.g., whether a link to the CF is oversubscribed and/or whether the CF has sufficient resources to process the packet, among other considerations. Periodically, the network device associated with the CF can query the CF, e.g., a management information base (MIB) associated with the CF, for its current load and/or the network device associated with the CF can maintain rate counters for how much traffic is being sent to the CF. Determining whether the link to the CF is oversubscribed and/or whether CF has sufficient resources to process packets can be an ongoing function of the network device associated with the CF.

If the packet can be sent to the CF, e.g., if the CF can process the packet, the network device associated with the CF decapsulates the packet and sends 610 it to the CF. The CF can process 612 the packet, e.g., according to one or more of its checking capabilities, and approve or fail the packet, e.g., determine whether the packet passes a number of security checks. It the packet does not pass the security checks, then the CF can fail, e.g., drop, 613 the packet. Such a fail, e.g., drop, action can be substantially similar to a DENY action such that the client is prohibited from sending packets of a particular type and content, e.g., the particular type and content of the dropped packet, to the original intended destination.

If the CF approves 612 the packet, then the CF has processed and will return 614 the packet to the network device associated with the selected CF. The network device associated with the selected CF return-tunnels 616 the packet to the first network device with an ECT codepoint in the IP header of the tunnel encapsulation. Additionally, as a part of the encapsulation header, a CF_processed flag can be included to indicate that the CF successfully processed the packet, as well as a CF_forward_congestion flag to indicate the congestion state of the forward data path, e.g., whether congestion was experienced from the first network device to the second network device. This information is taken from the forward congestion status table, such as the congestion flag associated with the destination address, e.g., IP destination address, of the second network device to which the packet is being tunneled. Furthermore, other additional information may also be included in the tunnel encapsulation header, e.g., CF load, CF status, CF capabilities, etc., among other information.

The first network device can extract 618 information from the encapsulation header upon receipt of the packet. Such information can include information relating to congestion on a network path from the first network device to the network device associated with the CF, e.g., the CF_forward_congestion flag, CF load/congestion information, whether the packet was processed and/or approved by the CF, e.g., the CF_processed flag, information relating to congestion on a network path from the (second) network device associated with the CF to the first network device, e.g., taken from the ECN bits of the encapsulating IP header, among other information. Upon receipt of such information, the first network device can update its CF capabilities table, e.g., table 460 in FIG. 4, to reflect the new CF load, e.g., column 467 in table 460, CF network congestion, e.g., column 468 in table 460, and CF capabilities, e.g., column 463 in table 460, as appropriate.

Such information can be stored in a generic routing encapsulation (GRE) header, for example, in a GRE key field, an example of which is described in more detail in co-pending, commonly assigned U.S. patent application Ser. No. 11/796,973, entitled "Remote Client Remediation," and having at least one common inventor, filed Apr. 30, 2007. As another example, such information can be stored as a payload to a User Datagram Protocol (UDP) packet. Embodiments are not limited to these examples.

Having received the indication that the packet was processed and approved by the CF, the first network device can determine whether the packet should receive further processing by another CF 619. In an embodiment of the present invention, an indication received by the first network device that the CF processed the packet can be equivalent to an indication that the CF approved, e.g., did not fail, the packet because the CF can drop failed packets, which would therefore, not be return-tunneled to the first network device.

If the packet will not receive further processing by another CF, the first network device can forward 620 the packet to the original destination network address of the packet. If the packet should receive further processing by another CF, the first network device can select 621 another CF to process the packet. The first network device can tunnel 604 the packet to the other CF for processing as described herein. As described herein, elements can be added, modified, or eliminated to provide additional embodiments. For example, the determination by the first network device whether the packet should receive further processing by another CF 619 can be eliminated, in some embodiments, such that if the first CF approves the packet, then the first network device can forward the packet to its original destination without making a determination as to whether the packet should receive additional processing by another CF.

Returning to the determination 608 whether the packet can be sent to the CF, if it cannot be sent to the CF, the network device associated with the selected CF return-tunnels 622 the packet to the first network device with an ECT codepoint in the IP header of the tunnel encapsulation, a CF_not_processed flag, and additional information in the header of the tunnel encapsulation. Examples of when the packet cannot be sent to the CF include when the second network device has insufficient tunnel resources, e.g., when a second network device does not have enough available tunnels to receive the packet, when a link between the second network device and the CF is oversubscribed, e.g., when the link between the second network device and the CF is congested to the point that additional packets can not reliably be transported using the link, when the CF has insufficient resources to process the packet, e.g., when a load on the CF reaches a capacity level for the CF, and when the CF has been disabled from processing packets, among others. An example of when a CF may be disabled from processing packets is when a network administrator disables the CF for maintenance operations.

Upon receipt of the packet, the first network device extracts 624 information from the encapsulation header. Upon receipt of such information, the first network device can again update its CF capabilities table, e.g., table 460 in FIG. 4, to reflect the new CF load, e.g., column 467 in table 460, CF network congestion, e.g., column 468 in table 460, and CF capabilities, e.g., column 463 in table 460, as appropriate. In response to an indication that the CF did not process the packet, the first network device selects 626 a different CF to process the packet. The first network device can tunnel 604 the packet to the different CF for processing as described herein.

Although the present disclosure refers to ECN as a means of indicating congestion in network paths, as the reader will appreciate, other congestion notification schemes are possible. Embodiments of the present invention are not limited to any particular congestion notification scheme, as such information can be made use of in the form in which it is presented.

Figure 7:
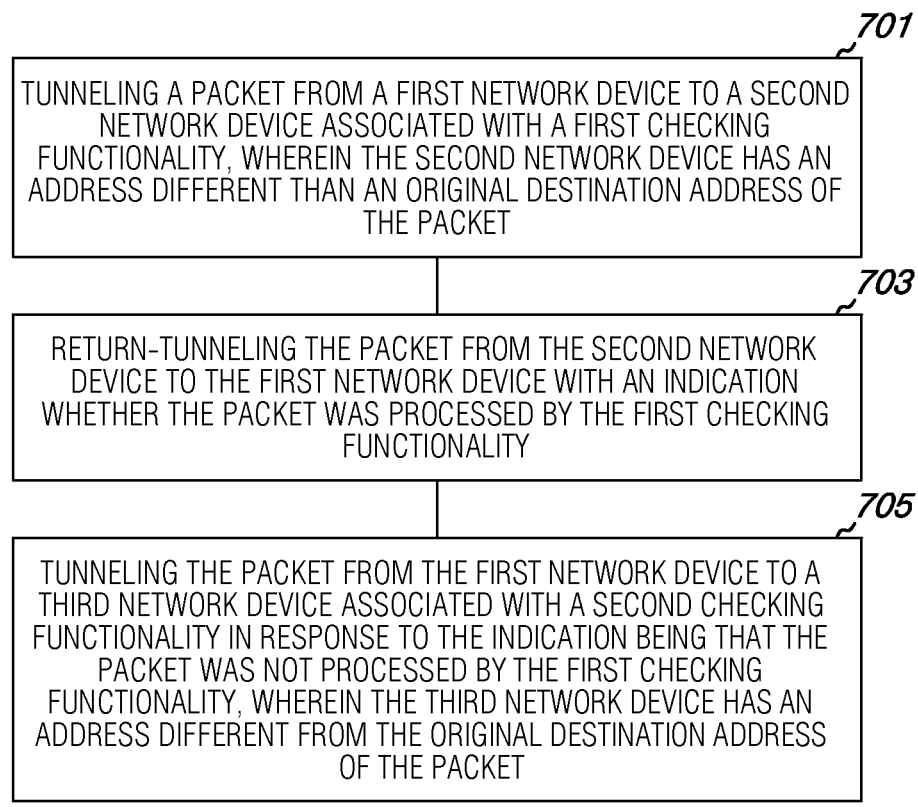
FIG. 7 provides a flow chart illustrating one method for packet processing according to an embodiment of the present invention.

FIG. 7 provides a flow chart illustrating one method for packet processing according to an embodiment of the present invention. The method includes 701 tunneling a packet from a first network device to a second network device associated with a first checking functionality, wherein the second network device has an address different than an original destination address of the packet. The method also includes 703 return-tunneling the packet from the second network device to the first network device with an indication whether the packet was processed by the first checking functionality. The method includes 705 tunneling the packet from the first network device to a third network device associated with a second checking functionality in response to the indication being that the packet was not processed by the first checking functionality, wherein the third network device has an address different from the original destination address of the packet. Logic, which is operable to perform the method described in connection with FIG. 7, can be present in whole or in part in embodiments of other figures. Embodiments, however, are not limited to the example given herein.

It is to be understood that the above description has been made in an illustrative fashion, and not a restrictive one. Although specific embodiments have been illustrated and described herein, those of ordinary skill in the art will appreciate that other component arrangements and device logic can be substituted for the specific embodiments shown. The claims are intended to cover such adaptations or variations of embodiments of the present invention, except to the extent limited by the prior art.

In the foregoing Detailed Description, various features are grouped together in a single embodiment for the purpose of streamlining the disclosure. This method of description is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A method for processing packets, comprising:
    tunneling a packet from a first network device to a second network device associated with a first checking functionality, wherein the second network device has an address different than an original destination address of the packet;
    receiving the packet return-tunneled from the second network device to the first network device with an indication of whether the packet was processed by the first checking functionality; and
    tunneling the packet from the first network device to a third network device associated with a second checking functionality in response to the indication being that the packet was not processed by the first checking functionality, wherein the third network device has an address different from the original destination address of the packet.

2. The method of claim 1, wherein the method includes sending the packet from the first network device to the original destination address of the packet in response to the indication being that the packet was processed and approved by the first checking functionality.

3. The method of claim 1, wherein the method includes:
    tunneling a subsequent packet from the first network device to the third network device in response to the indication being that the packet was not processed by the first checking functionality; and
    tunneling subsequent packets received from a particular client to the third network device in response to the indication being that the packet was not processed by the first checking functionality when the packet was from the particular client.

4. The method of claim 1, wherein the method includes:
    receiving a notification with the first network device of congestion for one or more network paths selected from the group including:
        a network path between the first network device and the second network device; and
        a network path between the second network device and the first network device; and
    tunneling subsequent packets from the first network device to the third network device in response to the first network device being notified of congestion for one or more network paths.

5. The method of claim 4, wherein receiving the notification with the first network device of congestion includes updating a capabilities table stored on the first network device for the first checking functionality based on information associated with the packet return-tunneled from the second network device.

6. The method of claim 1, wherein the method includes receiving the packet return-tunneled from the second network device to the first network device with the indication that the packet was not processed by the first checking functionality when one or more conditions exist selected from the group including:
- the second network device has insufficient tunnel resources;
- a link between the second network device and the first checking functionality is oversubscribed;
- the first checking functionality has insufficient resources; and
- the first checking functionality has been disabled from processing packets.

7. The method of claim 6, wherein the method includes determining a resource status of the first checking functionality with the second network device by querying a management information base (MIB) associated with the first checking functionality.

8. The method of claim 1, wherein the method includes dropping the packet with the first checking functionality in response to the first checking functionality processing and failing the packet.

9. A network device, comprising:
a network chip including logic, embedded in an application specific integrated circuit, and a number of network ports for the device to receive and transmit packets therefrom, wherein the network chip is to:
- determine whether a link from the network device to a checking functionality is oversubscribed;
- determine a resource status of the checking functionality;
- receive a packet tunneled from a different network device; and
- return-tunnel the packet to the different network device with an indication that the checking functionality did not process the packet in response to one or more of the link being oversubscribed and the resource status indicating that the checking functionality has insufficient resources to process the packet.

10. The network device of claim 9, wherein the checking functionality is a chip including logic, embedded in an application specific integrated circuit located on the network device.

11. The network device of claim 9, wherein the network chip is to send the packet to the checking functionality in response to the link to the checking functionality not being oversubscribed and the resource status of the checking functionality indicating that the checking functionality has sufficient available resources to process the packet.

12. The network device of claim 9, wherein the network chip is to store the indication in a generic routing encapsulation (GRE) header associated with an encapsulation of the return-tunnel.

13. The network device of claim 9, wherein the network chip is to:
- determine whether the packet experienced congestion along a network path to the network device; and
- return-tunnel the packet with information indicating whether the packet experienced congestion.

14. A network, comprising:
a first network device, a second network device, and a third network device, each having a network chip including logic and a number of network ports for the device for receiving and transmitting packets therefrom;
a first checking functionality associated with the second network device; and
a second checking functionality associated with the third network device;
wherein the first network device is to tunnel a packet to the second network device;
wherein the second network device is to:
- determine whether a link between the second network device and the first checking functionality is oversubscribed;
- determine whether the first checking functionality has sufficient resources to process the packet; and
- return-tunnel the packet to the first network device with an indication that the first checking functionality did not process the packet in response to one or more of the link being oversubscribed and the first checking functionality having insufficient resources to process the packet.

15. The network of claim 14, wherein the first network device is to tunnel the packet to the third network device for processing by the second checking functionality in response to the packet being return-tunneled from the second network device with the indication that the first checking functionality did not process the packet.

16. The network of claim 14, wherein the packet has an original destination address that is different from an address of the second network device and the third network device.

17. The network of claim 14, wherein the second network device is to send the packet to the first checking functionality in response to the link not being oversubscribed and the first checking functionality having sufficient resources to process the packet.

18. The network of claim 17, wherein the first checking functionality is to:
- drop the packet in response to the first checking functionality processing and failing the packet; and
- return the packet to the second network device in response to the first checking functionality processing and approving the packet.

19. The network of claim 18, wherein:
the second network device is to return tunnel the packet to the first network device with an indication that the checking functionality processed and approved the packet; and
the first network device is to send the packet to an original destination address of the packet.

20. The network of claim 14, wherein:
the packet is one of a number of packets from a client associated with the first network device;
the second network device is to determine whether the packet experienced congestion on a network path from the first network device to the second network device; and
the first network device is to:
- determine whether the packet experienced congestion on a network path from the second network device to the first network device; and
- tunnel the number of packets from the client to the third network device when the packet experienced congestion in at least one of the network path from the first network device to the second network device and the network path from the second network device to the first network device.

* * * * *